Ahmad, J. Emerg. Trauma Shock, 2009.

United States Patent [19]
Gohara et al.

[11] Patent Number: 5,159,591
[45] Date of Patent: Oct. 27, 1992

[54] PACKET COMMUNICATION METHOD, PACKET COMMUNICATION DEVICE AND PACKET SWITCHER

[75] Inventors: Shinobu Gohara; Yutaka Torii, both of Yokohama, Japan

[73] Assignee: Hitachi, Ltd., Tokyo, Japan

[21] Appl. No.: 569,025

[22] Filed: Aug. 17, 1990

Related U.S. Application Data

[63] Continuation-in-part of Ser. No. 382,419, Jul. 20, 1989, Pat. No. 4,956,839.

[30] Foreign Application Priority Data

Dec. 5, 1989 [JP] Japan ................................. 1-315988

[51] Int. Cl.$^5$ ........................................... H04Q 11/04
[52] U.S. Cl. ..................................... 370/60; 370/94.1
[58] Field of Search ................................ 370/60, 94.1

[56] References Cited

U.S. PATENT DOCUMENTS

| | | | |
|---|---|---|---|
| 4,670,871 | 6/1987 | Vaidya | 370/60 |
| 4,771,419 | 9/1988 | Graves et al. | 370/68.1 |
| 4,782,478 | 11/1988 | Day, Jr. et al. | 370/60 |
| 4,956,839 | 9/1990 | Torii et al. | 370/60 |
| 4,965,788 | 10/1990 | Newman | 370/60 |

*Primary Examiner*—Benedict V. Safourek
*Assistant Examiner*—T. Samuel
*Attorney, Agent, or Firm*—Antonelli, Terry Stout & Kraus

[57] ABSTRACT

In a packet communication method, a packet communication device, an input transmission frame of V (bytes/sec) consisting of a transmission overhead of $V_{OH}$ (bytes/sec) containing control information for transmission and a pay load of $V_p$ (bytes/sec) of c ($=a+b$) bytes, the outer cell consisting of an information field of a b-byte length containing transmission data and a header field of an a-byte length containing a first control information for transmitting the information field. The transmission overhead is removed from and a second control information is added to the input transmission frame. The input transmission frame with the second control information and without the transmission overhead is converted to a plurality of inner cell trains of f ($=b+j$) bytes length, the inner cell trains consisting of an information field of a b-byte containing the transmission data and a second header field of j ($=a+d$) bytes consisting of the first control information and the second control information (where $f \times g = h \times V$, h is an integer or a fraction of an integer). Packets switching are performed on each inner cell. A plurality of inner cells are converted to an output transmission frame of V (bytes/sec) having the same format as the input transmission frame for transmission.

15 Claims, 5 Drawing Sheets

| ITEM NUMBER | CODING BIT 7 6 5 4 3 2 1 0 | MEANING |
|---|---|---|
| 0 | 0 ~ 0 0 | INDICATING ROUTING TO AN OPTICAL PORT #0 FOR SWITCH |
| 1 | 0 ~ 0 1 | ″ #1 ″ |
| ⋮ | ⋮ | ⋮ |
| 254 | 1 ~ 1 0 | ″ #254 ″ |
| 255 | 1 ~ 1 1 | ″ #255 ″ |

FIG. 6

PACKET COMMUNICATION METHOD, PACKET COMMUNICATION DEVICE AND PACKET SWITCHER

CROSS-REFERENCE TO RELEVANT APPLICATIONS

This application is a continuation-in-part of U.S. application Ser. No. 382,419, filed Jul. 20, 1989, now U.S. Pat. No. 4,956,839, issued Sep. 11, 1990.

The present application is relevant to U.S. Pat. No. 4,910,731 filed Jul. 13, 1988 and entitled "Switching System and Method of Construction Thereof" in the name of Y. Sakurai.

BACKGROUND OF THE INVENTION

The present invention relates to a communication processing device such as a switcher for switching fixed-length packets or a multiplexing device, and in particular to the communication processing device which is capable of supporting an ATM (Asynchronous Transfer Mode) indicated in the CCITT recommendation I.121.

Such a digital communication network designed to support the switching of fixed-length packets includes a transmission-line I/O interface, which may be defined so that a cell with a length c ($=a+b$) consisting of a header field of an a-byte length and an information field of a b-type length is located on a pay load of a transmission frame consisting of an overhead part having a velocity of $V_{OH}$(bytes/sec) and a pay load part having a velocity of $V_P$(bytes/sec).

For example, the switcher serves to switch only each cell portion of the interface and the multiplexing device also serves to multiplex only each cell portion.

If the communication processing device has the foregoing I/O interface, it mainly treats only each cell portion.

In this instance, therefore, the communication processing device generally has the main function of:

(1) Switching a rate for picking up only a pay load portion from the transmission frame and treating each cell as a train of successive cells, or (2) Entering the I/O interface format to a switch, controlling the action and stop of the switch portion for treating a transmission overhead portion, discontinuously picking up cell portions only by discontinuously operating the switch, and treating them.

The foregoing prior art employing the function (1) requires a plurality of clock generation sources since it operates on respective rate sequences for the internal portion and the I/O portion of the switching device. It results in disadvantageously raising the cost.

The foregoing prior art employing the function (2) also has a disadvantage that a complicated control system is required for controlling the action and stop of the switch and matching the phase of an input interface to another.

In particular, in several places such as the CCITT, the ATM has been under study as a transfer system realizing a wide-band ISDN. The communication processing device such as the switcher designed to support the ATM (referred to as an ATM switcher) or the multiplexing device, in general, includes an I/O interface of a transmission line, which may be defined so that a cell with a length c ($=a+b$) consisting of a header field of an a-byte length and an information field of a b-type length is located on a pay load of a transmission frame consisting of an overhead part having a velocity of $V_{OH}$(bytes/sec) and the pay load part having a velocity of $V_P$(bytes/sec), as indicated in FIG. 7/I.121(C) of the reference document I.121. The communication processing device supporting the ATM, hence, has the foregoing problems.

SUMMARY OF THE INVENTION

It is therefore an object of the present invention to provide a packet communication method, a packet communication device and a packet switcher which are allowed to operate on a single clock rate sequence without having to perform the switching control in a complicated manner.

In order to achieve the foregoing object, the present invention provides a packet processing device which converts an I/O transmission frame having a total velocity of V(bytes/sec) consisting of a transmission overhead part having a velocity of $V_{OH}$(bytes/sec) and a pay load part having a velocity of $V_P$(bytes/sec) having a fixed-length packet of totally c($c=a+b$) bytes consisting of an a-byte length header field and a b-type length information field located thereon (the fixed-length packet will be later referred as to an outer cell) into, an inner cell train (g cell/sec) consisting of f bytes containing a b-byte information field (where $f \times g = h \times V$, h is an integer or a fraction of an integer), and treats each inner cell.

Further, in order to achieve the foregoing object, the present invention provides a communication processing device having a communication interface using an I/O transmission frame having a total velocity of V(bytes/sec) consisting of a transmission overhead part having a velocity of $V_{OH}$(bytes/sec) and a pay load part having a velocity of $V_P$(bytes/sec) having a fixed-length packet of totally c($c=a+b$) bytes consisting of an a-byte length header field and a b-type length information field located on the pay load, further comprising;

means for performing terminal processing such as frame synchronization, detection of a parity check alarm, and notification, cell-length converting means for converting a header length into j bytes, an information field length into b bytes, totally converting each outer cell into a f-byte (a and j totals f) cell (herein, referred to as an inner cell), means for assembling an inner cell train containing inner cells (g cell/sec, wherein $f \times g = h \times V$, h is an integer or a fraction of an integer) and outputting the assembled inner cell train, and means for treating each inner train contained in the inner cell train.

In the communication processing device, b, c, f, h and V preferably have the relations of;

$$h \times V \times 125 \times 10^{-6}/f = k \ (k \text{ is integer) and}$$

$$b \times h \times V/f \geqq b \times V/c$$

Further, the I/O transmission frame may include a frame format designed according to the CCITT recommendation G.707 to 709 and assume a as five bytes, b as 48 bytes, c as 53 bytes and f as 54 bytes.

In order to achieve the foregoing object, the present invention provides a packet switcher for switching a fixed-length packet of totally c ($=a+b$) bytes consisting of a header field of a bytes and an information field of b bytes, said fixed-length packet being located on an I/O transmission frame having a total velocity of V (bytes/sec) consisting of a transmission overhead part having a velocity of $V_{OH}$(bytes/sec) and a pay load part having a velocity of V(bytes/sec), which comprises means for performing terminal processing such as frame synchronization, detection of a parity check alarm and notification, said terminal processing containing deletion and addition of the transmission overhead, means for converting a cell length of each outer cell into a totally f-byte cell length consisting of the header field length of j bytes and the information field length of b bytes, that is, the outer cell into an inner cell, means for assembling a inner cell train containing the inner cells (g cell/sec, where $f \times g = h \times V$, h is an integer and a fraction of an integer) and outputting the inner cell train, and a switching section for switching the inner cell contained in the inner cell train.

The switcher is preferably designed so that the header field contained in the inner cell includes information about an output port at which the inner cell is switched, that is, a highway and the switching section serves to switch each inner cell on the information.

According to an aspect of the invention, the packet processing device is designed to convert an I/O transmission frame having a total velocity of V(bytes/sec) consisting of a transmission overhead part having a velocity of $V_{OH}$(bytes/sec) and a pay load part having a velocity of $V_P$(bytes/sec) having a packet of a totally c-byte (c=a+b) fixed length consisting of a header field of an a-byte length and an information field of a b-byte length located on the pay load into an f-byte inner cell train (g cell/sec) containing a b-byte information field (wherein $f \times g = h \times V$, h is an integer or a fraction of an integer), and treating each inner cell.

The communication processing device is designed to perform terminal processing such as frame synchronization, detection of a parity check alarm and notification, said terminal processing containing deletion of the transmission overhead contained in the input transmission frame, convert each outer cell into an inner cell of totally f bytes consisting of a header length of j bytes and an information field length of b bytes, assemble an inner cell train (g cell/sec, where $f \times g = h \times V$, h is an integer or a fraction of an integer), and treat each inner cell contained in the inner cell train.

Assuming that the communication processing device offers the relation of $h \times V \times 125 \times 10^{-6}/f = k$ (k is an integer), by counting the inner cells, it is possible to obtain timing information of 8 kHz which is the basic timing of a digital network.

Assuming it offers the relation of $b \times h \times V/f \geq b \times V/c$, it is possible to enhance a utilization rate of the outer cell.

Further, assuming that the I/O transmission frame has a frame format designed according to the CCITT recommendation G.707 to 709, a is five bytes, b is 48 bytes, c is 53 bytes, and f is 54 bytes, the communication processing device operates similarly.

According to an aspect of the invention, the packet switcher is designed to perform terminal processing such as frame synchronization, detection of a parity check alarm and notification, said terminal processing containing deletion of the transmission overhead contained in the input transmission frame, convert each outer cell into an inner cell of totally f bytes consisting of a header length of j bytes and an information field length of b bytes, assemble an inner cell train (g cell/sec, where $f \times g = h \times V$, h is an integer or a fraction of an integer). It includes a switching section, which serves to switch the inner cell contained in the inner cell train.

Assuming that the header field of the inner cell contains information about an output port at which the inner cell is switched, the switching section serves to switch each inner cell based on the information. This assumption makes it possible to reduce the number of interface lines in the switcher.

As set forth above, the present invention can realize a communication processing device such as a packet switcher which is capable of operating on a single clock rate sequence without having to perform the switching control in a complicated manner.

DESCRIPTION OF THE PREFERRED EMBODIMENT

A description will be directed to an ATM switcher designed according to an embodiment of the present invention.

Figure 1:
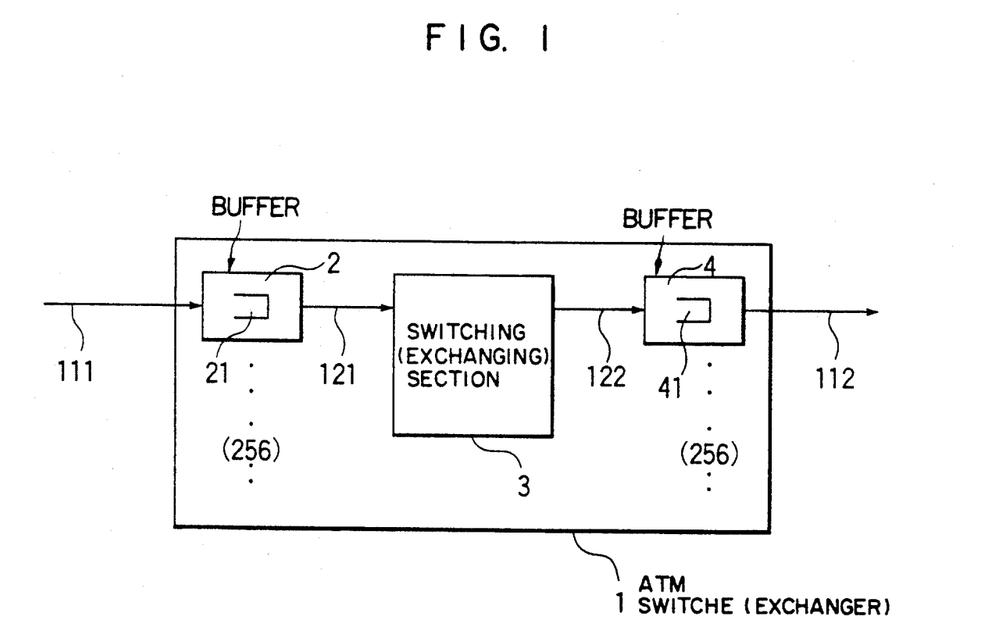
FIG. 1 is a block diagram showing arrangement of an ATM switcher according to an embodiment of the invention.

FIG. 1 shows arrangement of an essential portion of the ATM switcher designed according to the embodiment.

Herein, for convenience's sake, assume that the ATM switcher is designed to accommodate 256 I/O interface lines of 155.52Mb/s.

As shown in FIG. 1, 3 denotes a switching section for switching cells, 2 denotes a receiving-side transmission-line interface section, and 4 denotes a transmitting-side transmission-line interface section for matching a transmitting interface with the transmission line. The receiving-side transmission-line interface section 2 provides a received cell buffer 21 and the transmitting-side transmission-line interface section 4 provides a transmitted cell buffer 41.

111 and 112 denote I/O transmission line interfaces and 121 and 122 denote internal highways.

Next, with reference to FIG. 2, the operation of the ATM switcher will be described.

Figure 2:
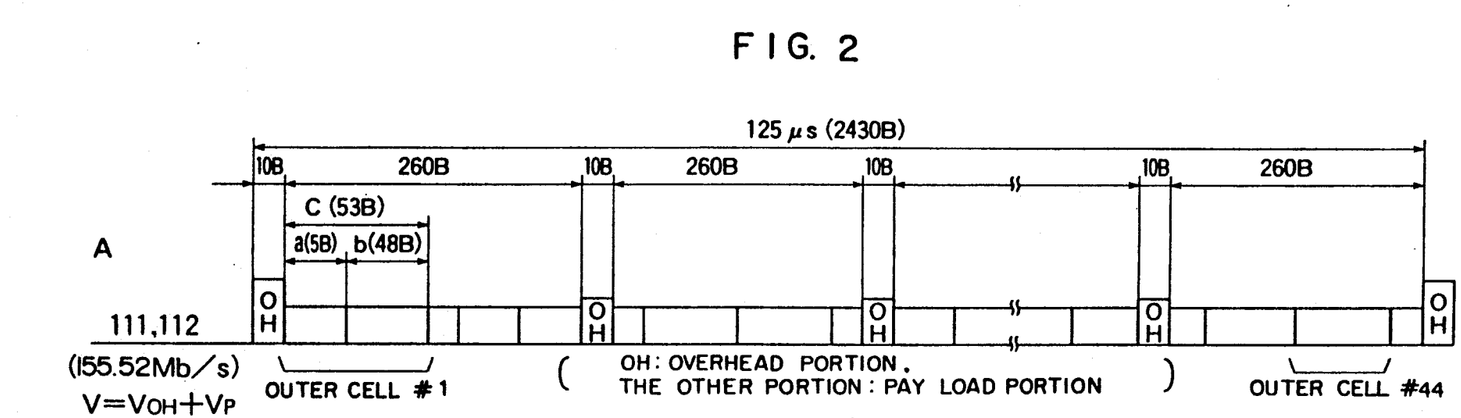
FIGS. 2 and 2' are views illustrating cell structures provided on a transmission line and inside of the switcher.

The I/O transmission line interfaces 111, 112 are designed so that the transmission format complies with the G.707 to 709 standard and the cell structure is 53B consisting of a header length of 5B and an information field length of 48B (see FIG. 2A).

The ATM switcher serves to switch a cell train located on the I/O transmission lines into an inner cell train (see FIG. 2B) located on inner highways 121, 122 of totally 54B consisting of a header length of 6B and an information field length of 48B and switch the inner cells with each other on the switching section 3 as the switcher is controlling the write and read of the received cell buffer 21 and the transmitted cell buffer 41.

The buffer 21 is located in the receiving-side transmission interface section 2 and the buffer 41 is located in the transmitting-side transmission interface section 4.

Figure 3:
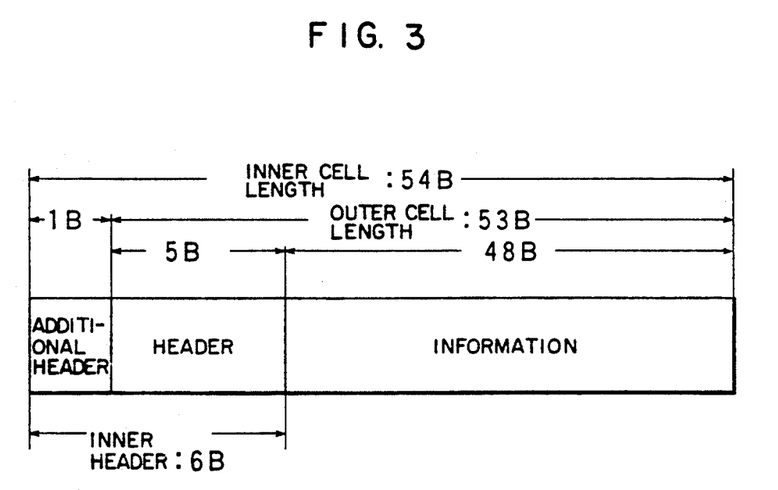
FIGS. 3 and 3' are views detailing the cell structure provided inside of the switcher.

FIG. 3 shows the arrangement of the inner cell in detail.

As shown in FIG. 3, the inner cell contains an additional one-byte (d-byte) header and an outer cell. The additional one-byte header has an output port number indicating an inner highway 122 to which the switching section 3 outputs the inner cell.

The switching section 3 serves to route the inner cell to the output port indicated by the output port number.

Figure 6:
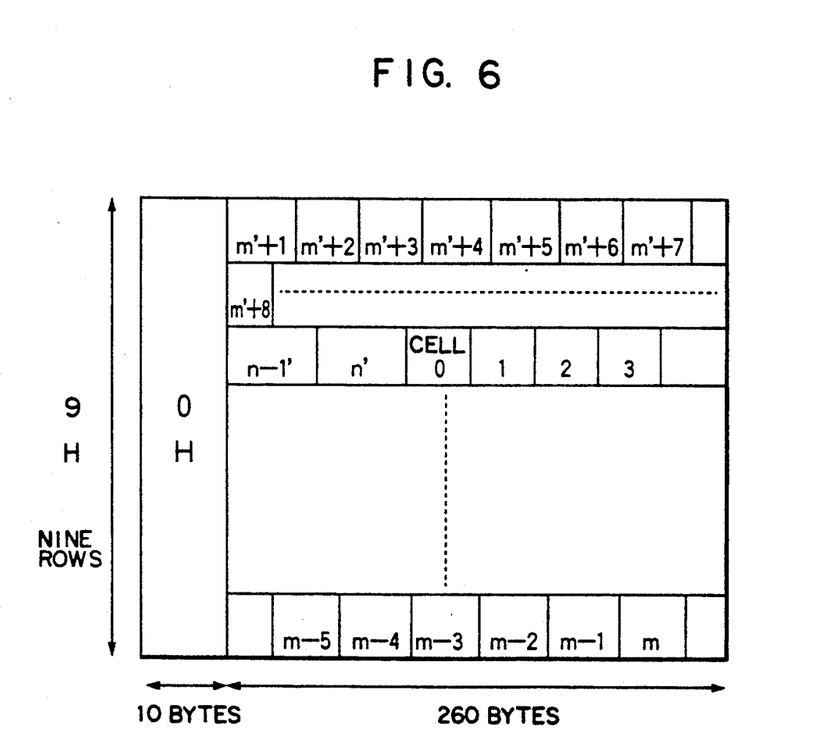
FIG. 6 is a view illustrating a frame format of SDH (Synchronous Digital Hierarchy).

A frame format of SDH (Synchronous Digital Hierarchy) will be shown in FIG. 6.

Figure 4:
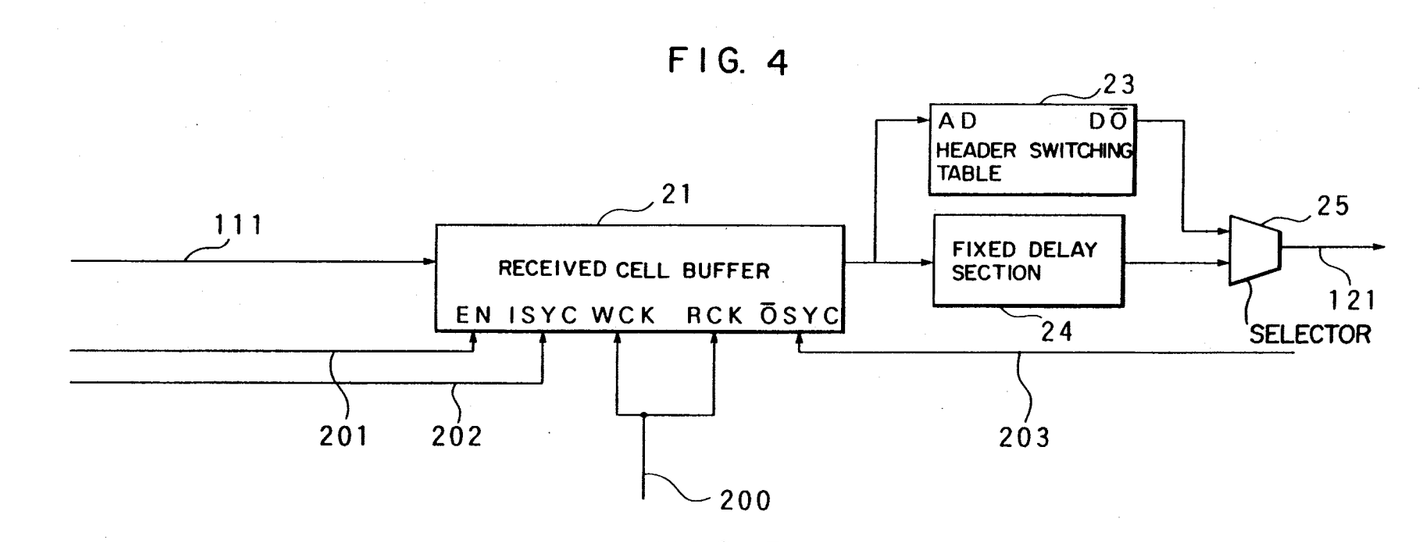
FIG. 4 is a block diagram showing arrangement of a transmission line interface on a receiving side.
Figure 5:
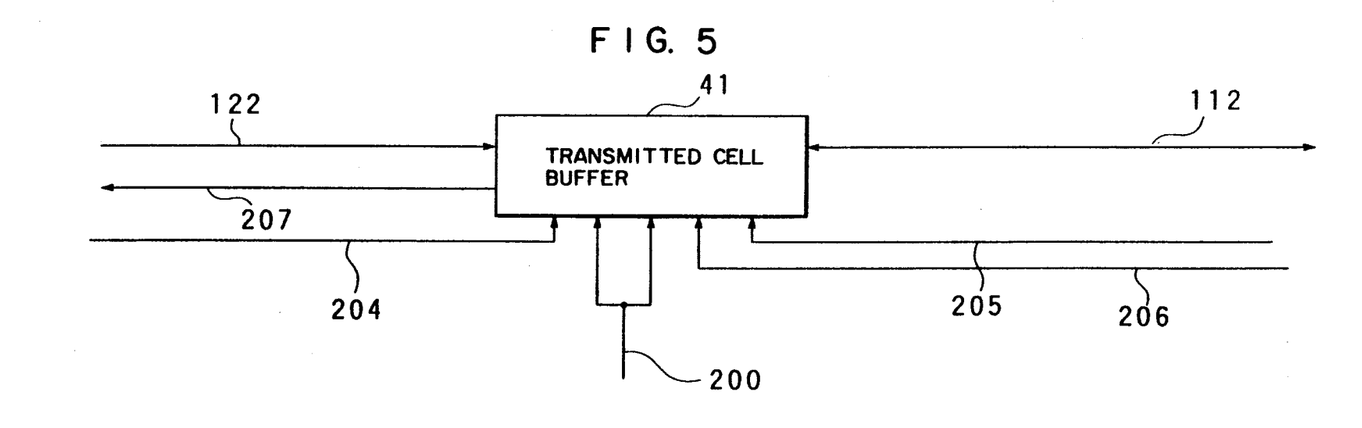
FIG. 5 is a block diagram showing arrangement of a transmission line interface on a transmitting side.

Next, FIG. 4 shows arrangement of the receiving-side transmission-line interface 2.

The receiving-side transmission-line interface section 2 provides the received cell buffer 21, a header conversion table 23, a fixed delay section 24, and a header/information selector 25.

The outer cell train transmitted on the input transmission line 111 is written in the received cell buffer 21 in synchronization to a write enable signal 201 and a write head signal 202. In the received cell buffer 21, only the cell portion is written. The write enable signal 201 indicates a pay load portion located on the input transmission line and the write cell head signal 202 indicating a head position of each outer cell located on the input transmission line 111. Both signals are extracted on a timing from the input signal on the receiving-side transmission line by a transmission frame terminal section (not shown) for performing some kinds of processing such as frame synchronization, detection of a parity check alarm and notification.

The header portion and the information field portion are read from the received cell buffer 21 in synchronization to a readout cell head signal 203. The readout cell head signal 203 is generated on each inner-cell-delimiting timing placed on the inner highway 112 by a switcher timing generating section (not shown). The header portion is transmitted to the header conversion table 23 and the information field portion is transmitted to the fixed delay section 24.

The header conversion table 23 serves to retrieve a header value to be updated and an additional header to be added from the header portion and then to transmit the information about the inner header used for the switcher to the header/information selector 25.

Herein, the header value indicates a channel to which each cell belongs and the update of the header value indicates the conversion of a channel identification code, for example, on the input transmission line into a channel identification code, for example, used in the switcher.

The information field portion transmitted to the fixed delay section 24 waits for a time required for accessing the header conversion table and a time corresponding to the additional header and then is sent to the header/information selector 25.

The header/information selector 25 serves to merge the inner header portion with the information field portion and then send out the result as an inner cell train to the receiving-side inner highway 121.

When the outer cell is converted into the inner cell as mentioned above, the input transmission line 111 has a different cell rate than the inner highway 121. It is thus necessary to insert an empty cell as an inner cell. That is, if no cell to be read exists in the buffer when reading the received cell buffer 21, the reading is controlled so that an empty cell is inserted to the inner cell train. The empty cell is discarded in the switching section 3.

As is understood from the fact that the inner cell structure and the inner highway structure are referenced by 121 and 122 in FIG. 1, a clock 200 used in the series of operations such as writing and reading can be assumed as a single cell rate sequence.

Then, FIG. 4 shows the arrangement of the transmitting-side transmission-line interface section 4.

As shown, the transmitting-side transmitting-line interface section 4 provides the transmitted cell buffer 41.

When the inner cell train is written from the transmitting-side inner highway 122 to the transmitted cell buffer 42 based on a written cell head signal 204, only the portion 53B is written therein, that is, the additional header is excluded. The written cell head signal 204 is generated on each inner-cell-delimiting timing placed on the inner highway 112 by the switcher timing generating section.

The outer cell train is read out of the transmitted cell buffer 41 in synchronization to a readout enable signal 205 and a readout cell head signal 206 and then is sent to the pay load portion of the output transmission frame. The readout enable signal 205 indicates the pay load portion located on the output transmission path 112 and the readout cell head signal 206 indicates the head position of each outer cell located on the output transmission line 112 and both signals are generated in the transmission frame terminal section.

As is understood from the fact that the inner cell structure and the inner highway structure are referenced by 121 and 122 in FIG. 1, a clock 200 used in the series of operations such as writing and reading can be assumed as a single cell rate sequence (the same cell rate sequence as the receiving side).

The cell rate given on the transmitting-side inner highway 122 is 45 cell/125 $\mu$s and the cell rate given on the output transmission line 112 is about 44.15 cell/125 $\mu$s or a bit more. For preventing instant overflow of the transmitted cell buffer 41, it is necessary to provide a mechanism for giving back a buffer busy signal 207 to the switching section 3 and temporarily stopping the transmission of the inner cell from the switching section 3 when the transmitted cell buffer 41 is busy. In general, however, the switcher itself and the I/O transmission line are subject to at most 70 to 80% utilization rate. The mechanism is thus effected only when failure takes place. The switcher whose utilization rate is limited may reduce this mechanism.

According to the present embodiment, as described above, the ATM switcher can have the same cell rate sequence on both the I/O transmission line and the inner highways so that the cell rates are allowed to be same on the transmission line and the inner highways. If a simple buffer is provided, it is possible to switch the outer cell train located on the I/O transmission line to the inner cell train located on the inner highways or vice versa. It results in arranging the ATM switcher without having to provide a mechanism for complicated controls such as multiple-clocks control or intermittent control of the switching.

Moreover, by inserting routing control information such as an output port number to an additional area of the inner header, the number of interface lines can be made smaller than the system for passing the routing control information on another line.

And, since the inner cell length is assumed to be a fraction of an integer of bytes within the I/O transmission line of 125 μs, inside of the switcher, the timing information of 8 kHz, which is a basic timing of a digital network included in the transmission line frame, can be easily referenced by counting a cell-delimiting timing. It results in offering an effect that it allows a band to be easily assigned to a switch output port if the existing digital communication (e.g. a voice of 64 Kb/s) is provided on the ATM switcher for switching the line (The voice of 64 Kb/s is controlled to be output at each 2160 cells).

In the foregoing description of the embodiment, assuming that the transfer rate of the I/O transmission frame is V (bytes/sec), the outer cell length is c bytes, the information field of the inner or outer cell is b bytes, the inner cell length is f bytes, and the transfer rate of the inner cell is g cell/sec, the embodiment has met the relations (1) $f \times g = h \times V$ (h is an integer or a fraction of an integer), (2) $h \times V \times 125 \times 10^{-6}/f = k$ (k is an integer), and (3) $b \times h \times b/f \geq v \times V/c$. Yet, it may be designed to meet the relation (1) only, in which case the clock rate given on the I/O transmission line and the clock rate given on the inner highway can be placed on the same rate sequence. Further, it may be designed to meet the relations (1) and (2) only, in which case the timing information, that is, a basic timing of 8 kHz of a digital network included in the transmission line frame can be easily referenced by counting the cell-delimiting timing even within the switcher. And, if it meets the relations (1), (2) and (3) like the foregoing embodiment, it results in enhancing a utilization rate of the outer cell.

As has been understood from the above description, the communication processing device related to the invention has been described with reference to the ATM switcher. It goes without saying that the invention may be applied to a multiplexing device and a general packet switcher in addition to the ATM switcher. In the applications, the processing of the inner cell makes it possible to provide the similar effect.

As described above, the present invention can offer a communication processing device such as a packet switcher which is capable of operating on a single clock rate sequence without having to perform the switching control in a complicated manner.

What is claimed is:

1. A packet communication method comprising the steps of;

receiving an input transmission frame having a rate of V (bytes/sec) and consisting of a transmission overhead part having a rate of $V_{OH}$ (bytes/sec) containing control information for transmission and a pay load part having a rate of $V_P$ (bytes/sec) and having at least one outer cell of c bytes, said outer cell consisting of an information field of a b-byte length containing transmission data and a header field of an a-byte length containing first control information for controlling transmission of said information field;

removing said transmission overhead part from said input transmission frame;

adding second control information of a d-byte length to said outer cell;

converting said outer cell and said second control information into an inner cell having a rate g (cell/sec) and being f bytes in length, said inner cell consisting of an information field of a b-byte length containing said transmission data and a header field of j bytes consisting of said first control information and said second control information, where $f = b + j$, $f \times g = h \times V$ and h is an integer or a fraction of an integer;

switching inner cells;

converting said plurality of inner cells into an output transmission frame having a rate of V (bytes/sec) and having the same format as said input transmission frame; and transmitting said output transmission frame.

2. The packet communication method as claimed in claim 1, wherein said second control information contains information indicating an output port at which said inner cell is switched in the cell switching.

3. The packet communication method as claimed in claim 1, wherein said b, c, f, h and V meet at least one of the relations of $h \times V \times 125 \times 10^{-6}/f = k$, where k is an integer, and $b \times h \times V/f \geq b \times V/c$.

4. The packet communication method as claimed in claim 1, wherein said I/O transmission frame includes a frame format which satisfies the CCITT recommendation G.707 to 709 and wherein a is 5 bytes, b is 48 bytes, c is 53 bytes, and f is 54 bytes.

5. A packet communication method comprising the steps of;

converting an I/O transmission frame having a total rate of V (bytes/sec) and consisting of a transmission overhead part having a rate of $V_{OH}$ (bytes/sec) and a pay load part having a rate of $V_P$ (bytes/sec), and having a fixed-length packet of c bytes located in said pay load part, said fixed-length packet consisting of a header field of an a-byte length and an information field of an b-byte length, into an inner cell train having a rate g (cell/sec) and being f bytes in length consisting of a b-byte information field and a j-byte header field (where $f = b + j$, $f \times g = h \times V$, h is an integer or a fraction of an integer; and processing each inner cell.

6. The packet communication method as claimed in claim 5, wherein said j-byte header field contains information indicating an output port at which said inner cell is switched operation in a packet switching.

7. A packet communication device comprising;

means for receiving an input transmission frame having a rate of V (bytes/sec) and consisting of a transmission overhead part having a rate of $V_{OH}$ (bytes/sec) containing control information for transmission and a pay load part having a rate of $V_P$ (bytes/sec) and having an outer cell of c bytes, said outer cell consisting of an information field of a b-byte length containing transmission data and a header field of an a-byte length containing a first control information for transmitting said information field;

means for removing said transmission overhead part from said input transmission frame;

means for adding second control information of a d-byte length to said outer cell;

means for converting said outer cell and said second control information into an inner cell having a rate g (cell/sec) and being f bytes in length, said inner cell consisting of an information field of a b-byte length containing said transmission data and a second header field of j bytes, consisting of said first control information and said second control information, where $f = b + j$, $f \times g = h \times V$ and h is an integer or a fraction of an integer;

means for switching inner cells;

means for converting said plurality of inner cells into an output transmission frame having a rate of V (bytes/sec) and having the same format as said input transmission frame; and means for transmitting said output transmission frame.

8. The packet communication device as claimed in claim 7, wherein said second control information contains information indicating an address to which the inner cell is sent in a cell switching operation.

9. The packet communication method as claimed in claim 7, wherein b, c, f, h and V meet at least one of the relations of $h \times V \times 125 \times 10^{-6}/f = k$ (k is an integer) and $b \times h \times V/f \geqq b \times V/c$.

10. The packet communication method as claimed in claim 7, wherein said I/O transmission frame includes a frame format which satisfies the CCITT recommendation G.707 to 709 and wherein a is 5 bytes, b is 48 bytes, c is 53 bytes, and f is 54 bytes.

11. A packet communication device comprising;

a first communication interface for receiving an input transmission frame having a rate of V (bytes/sec) and consisting of a transmission overhead part having a rate of $V_{OH}$ (bytes/sec) containing control information for transmission and a pay load part having a velocity of $V_P$ (bytes/sec) and having an outer cell of c bytes, said outer cell consisting of an information field of a b-byte length containing transmission data and a header field of an a-byte length containing first control information;

first terminal processing means for performing terminal processing including deletion of said transmission overhead part;

means for converting each outer cell into an inner cell of f bytes consisting of a j-byte header and a b-byte information field;

means for assembling an inner cell train having a rate g (cell/sec), where $f \times g = h \times V$ and h is an integer or a fraction of an integer, said inner cell train including a plurality of inner cells, and outputting said inner cell train;

means for processing said inner cell train;

second terminal processing means for performing terminal processing of said inner cell train, including addition of a transmission overhead part thereto; and a second communication interface for transmitting an output transmission frame which has the same format as the input transmission frame.

12. The packet communication method as claimed in claim 11, wherein b, c, f, h and V meet at least one of the relations of $h \times V \times 125 \times 10^{-6}/f = k$ (k is an integer) and $b \times h \times V/f \geqq b \times V/c$.

13. The packet communication method as claimed in claim 11, wherein said I/O transmission frame includes a frame format which satisfies the CCITT recommendation G.707 to 709 and wherein a is 5 bytes, b is 48 bytes, c is 53 bytes, and f is 54 bytes.

14. A packet switcher comprising;

means for inputting and outputting a fixed-length packet having a rate of V (bytes/sec) and consisting of a transmission overhead part having a rate of $V_{OH}$ (bytes/sec) containing control information for transmission and a pay load part having a rate of $V_P$ (bytes/sec) and having an outer cell of c bytes, said outer cell consisting of an information field of a b-byte length containing transmission data and a header field of an a-byte length containing first control information;

means for performing terminal processing including deletion and addition of said transmission overhead part;

means for converting each outer cell into an inner cell of f bytes consisting of a j-byte header and a b-byte information field;

means for assembling an inner cell train having a rate g (cell/sec), where $f \times g = h \times V$ and h is an integer or a fraction of an integer, said inner cell train consisting of a plurality of inner cells, and outputting said inner cell train; and a switching section for switching the inner cells included in the inner cell train.

15. The packet switcher as claimed in claim 14, wherein the header field of said inner cell contains information about an output port at which said inner cell is switched and said switching section serves to switch each inner cell based on said information.

* * * * *